United States Patent
Lawrence

[11] Patent Number: 6,010,325
[45] Date of Patent: *Jan. 4, 2000

[54] PIZZA DIE

[75] Inventor: Eric C. Lawrence, South El Monte, Calif.

[73] Assignee: Lawrence Equipment, South El Monte, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/056,989

[22] Filed: Apr. 8, 1998

[51] Int. Cl.[7] .......................... B29C 43/02; A21C 11/00
[52] U.S. Cl. ............ 425/364 R; 425/394; 425/DIG. 47; 425/437; 425/403
[58] Field of Search ................... 425/394, 364 R, 425/DIG. 47, DIG. 108, 437, 403; 426/512

[56] References Cited

U.S. PATENT DOCUMENTS

| Re. 30,222 | 2/1980 | Ruiz et al. ............................. 425/190 |
|---|---|---|
| 3,218,994 | 11/1965 | Valentyne . |
| 3,411,461 | 11/1968 | Groth . |
| 3,465,071 | 9/1969 | Edwards . |
| 4,303,677 | 12/1981 | De Acetis ................................. 426/27 |
| 4,417,867 | 11/1983 | Bauer . |
| 4,431,397 | 2/1984 | Fried et al. . |
| 4,511,324 | 4/1985 | Bauer . |
| 4,755,128 | 7/1988 | Alexander et al. . |
| 4,818,550 | 4/1989 | Davidson ................................. 425/281 |
| 5,123,831 | 6/1992 | Enqvist et al. ............................. 425/63 |
| 5,354,566 | 10/1994 | Addesso et al. . |
| 5,417,989 | 5/1995 | Atwood et al. . |
| 5,591,470 | 1/1997 | Bartley . |
| 5,799,832 | 9/1998 | Mayo ..................................... 222/135 |

Primary Examiner—James P. Mackey
Assistant Examiner—Mark A. Wentink
Attorney, Agent, or Firm—Lyon & Lyon LLP

[57] ABSTRACT

A machine for pressing and forming food products has a die including an inner die plate surrounded by an outer die ring. The inner die plate is axially movable relative the outer die ring, between an extended state and a compressed state. A circumferential flexible seal connects the inner die to the outer die ring. During operation, when the inner die moves from the extended state to the compressed state, the seal creates a groove for the formation of a ridge, or crust of pizza dough. The die is more easily manufactured, has a longer useful life, improves the reliability of the machine, and allows for making rising crust pizzas.

14 Claims, 5 Drawing Sheets

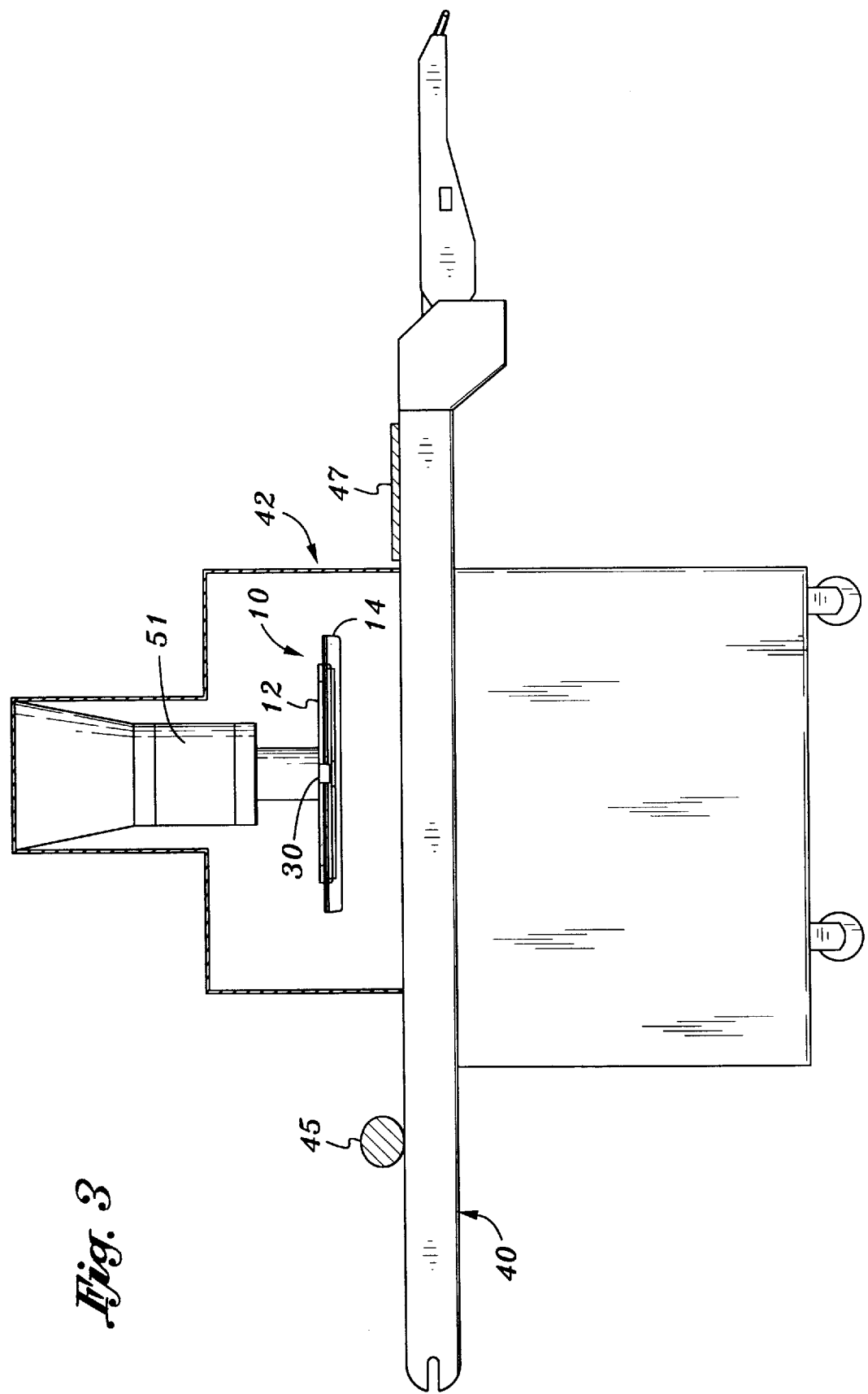

OUTER RING

INNER PLATE

PIZZA DIE

BACKGROUND OF THE INVENTION

The field of the invention is machines for making food products, such as pizzas.

Pizza shells or crust are made from a dough, typically with wheat flour. For large scale production, the dough is prepared in large batches, and individual dough balls are formed. To make a pizza, the dough must first be molded or flattened to the proper shape and thickness. For hand-made pizza, the dough is flattened by pressing it and stretching it, and via the ever popular pizza "toss". Small presses may also be used. For large scale production, a common method for forming pizzas is to press the dough in a pressing machine having one or more dies.

For most pizzas, the pressed pizza dough should preferably produce a finished food product that is close in taste and texture to a hand-made pizza dough. For example, it is preferable that the pressed dough retain its shape after formation. In addition, the pizza should also preferably bake as a hand-made pizza. For instance, it is often preferable that the dough rise during baking, especially in the crust region of the dough, for so called "rising crust" pizza.

Various attempts have been made to produce pizzas having these characteristics. One method uses multiple dies within a press to flatten the pizza dough. The press exerts a large pressing or flattening force on the dough ball. One common design has an inner die plate within a larger outer die ring. Typically, the inner die further includes a groove around its outer edge to form a ridge, or crust, in the pizza dough. The outer die ring very closely surrounds the inner die.

However, this design has a number of disadvantages. To prevent extrusion of pizza dough through the small gap between the inner die plate and the outer die ring, these components must be machined to extremely close tolerances. This increases the cost of production.

Usually, during pressing the dough is also heated by heaters on or around the pizza die. However, the heating of the die causes inner die plate and outer die ring to expand at different rates. This expansion of the components requires additional clearance between the inner die plate and outer die ring, to prevent them from seizing or binding. Unfortunately, the increased clearance also tends to permit dough to extrude through the annular gap between them.

Due to the close fit between the inner die plate and the outer die ring, the non-stick coating, such as TEFLON fluorine-containing polymers, typically used on these surfaces, wears off relatively quickly. This causes the pressed pizza dough to stick to the die, thereby stopping the production line. In practice, removal of the stuck dough from the die generally requires use of makeshift tools, that tend to scratch even more of the non-stick coating off of the die. Once the dough begins to stick, some manufacturers will use higher temperatures and/or longer dwell times to achieve better release characteristics, thereby producing a "hot pressed pizza". However the additional heat produces skin and core temperatures which kill most or all of the yeast in the dough. This prevents the dough from rising when baked.

The very close fit between the inner die plate and outer die ring can cause excessive heating in the outer die ring, even though the heating elements are in contact only with the inner die plate. Often, it is preferable for the pizza dough to rise during baking, e.g., for "rising crust" pizza. If the outer ring gets too hot, the yeast in the dough near the outer ring will be killed, thereby, preventing the crust from rising as desired. The close fit of the inner die plate and outer die ring can prevent the desired thermal isolation of the outer die ring.

For these reasons, the food industry needs better machines and methods for making pizzas, and other food products.

SUMMARY OF THE INVENTION

The present invention is directed to a machine for making food products. A press, such as a pizza press, has an inner die plate surrounded by an outer die ring. A flexible seal connects the inner die plate and the outer die ring.

The inner die is axially or vertically movable relative to the outer die ring. A circumferential seal connects the inner die plate and the outer die ring.

Accordingly, it is an object of the invention to provide an improved food product machine. Other and further objects and advantages will appear hereinafter.

BRIEF DESCRIPTION OF THE DRAWINGS

In the drawings, wherein similar reference characters denote similar elements, throughout the several views;

FIG. 3 is a schematic side view of a food machine having the die shown in FIG. 2.

DETAILED DESCRIPTION OF THE PREFERRED EMBODIMENT

Figure 1A:
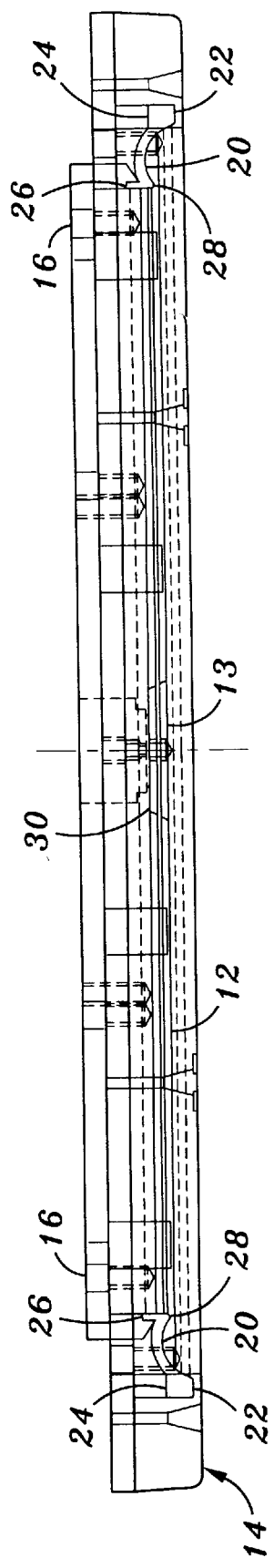
FIG. 1(a) is a cross-sectional side view of a food machine die in an up or extended state.
Figure 1B:
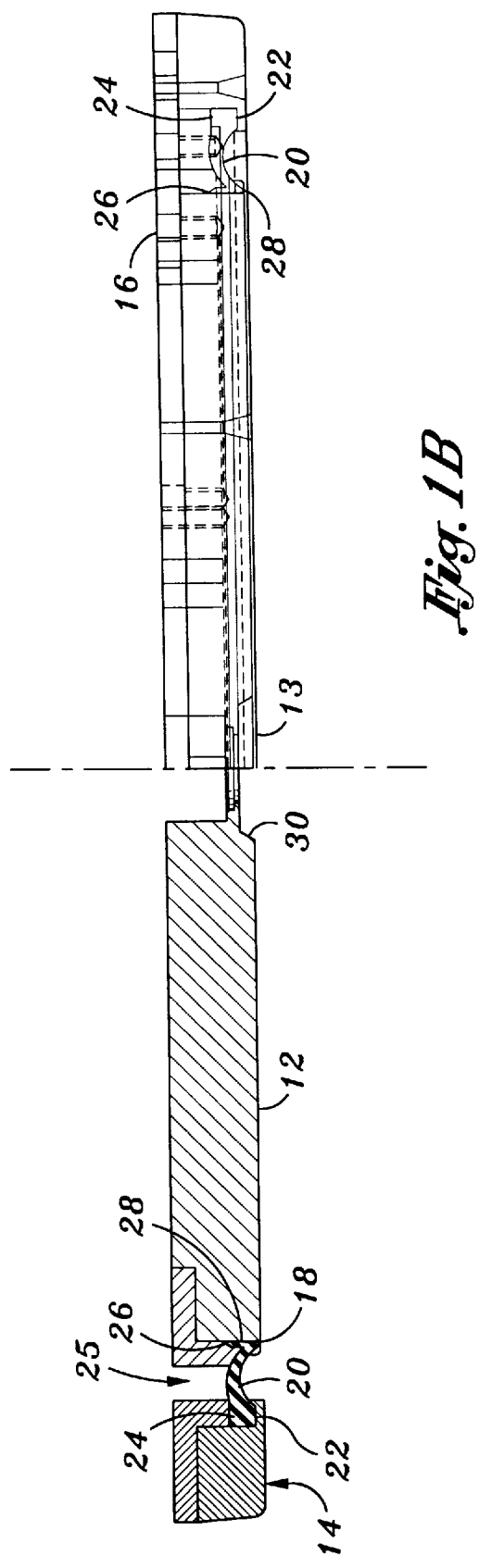
FIG. 1(b) is a cross-sectional side view of the food machine die of FIG. 1(a) in a down or compressed state.
Figure 2:
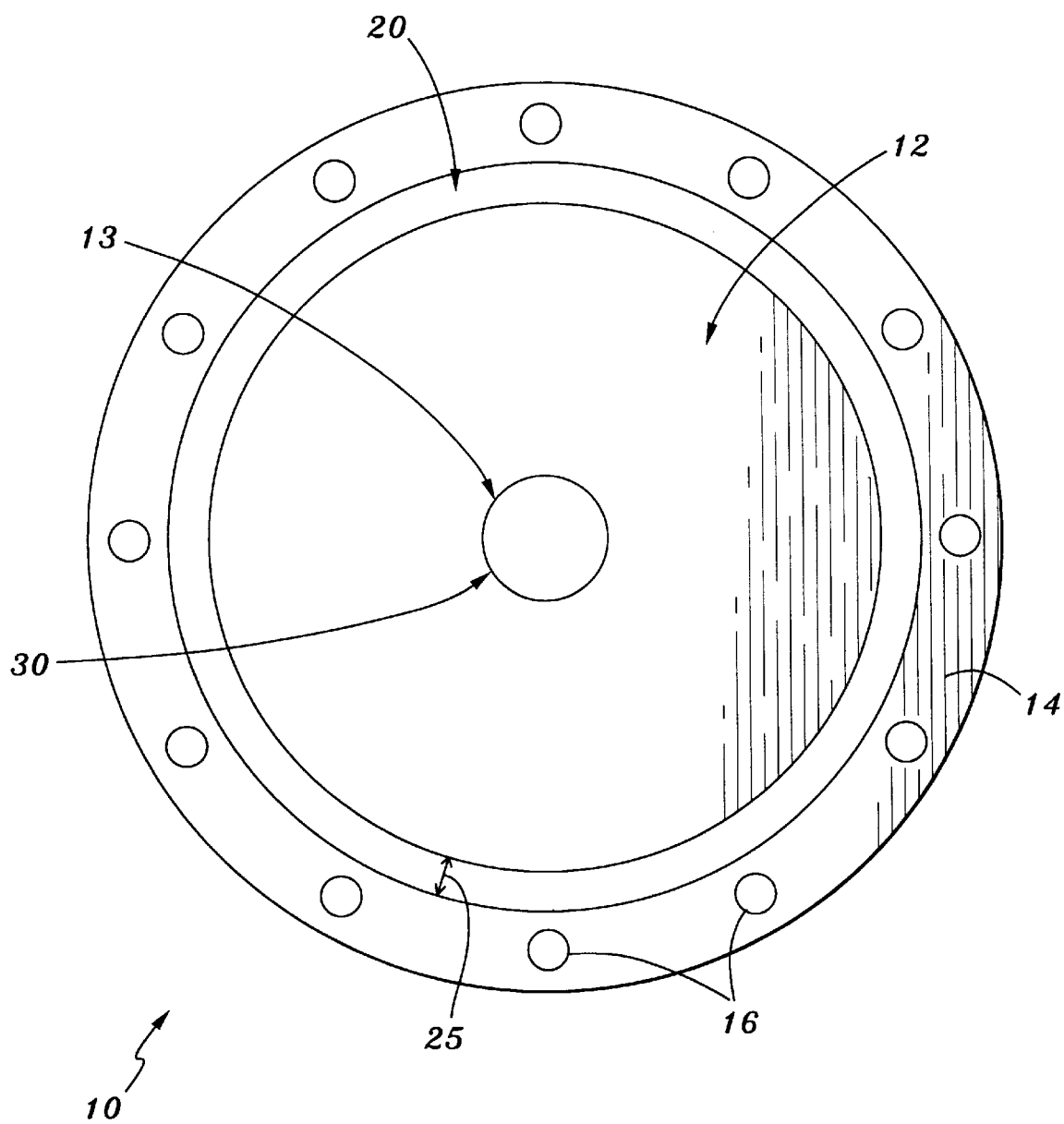
FIG. 2 is a plan view of the pizza die of FIGS. 1(a) and 1(b).

Turning now in detail to the drawings, as shown in FIGS. 1(a), 1(b), and 2, a food machine die, referred to here as a pizza die 10, includes an inner die plate 12 that is used to press a doughball 45 to make a pizza or other food product (not shown). Preferably, the inner die plate 12 is circular. The die 10 is horizontal and parallel to a pressing surface, such as a conveyor belt 40 or the like in a press 42, as shown in FIG. 3. Preferably, the inner die plate 12 is made of aluminum and the surfaces which come into contact with the dough are coated with a non-stick coating such as TEFLON fluorine-containing polymers. The inner die plate 12 is advantageously thermally conductive for use in hot-press operations.

An outer die ring 14 surrounds the inner die plate 12. The outer die ring 14 is also preferably made of aluminum with a non-stick coating on surfaces that come into contact with dough. The outer die ring 14 includes a plurality of holes 16 for bolting the pizza die 10 to a press 42 as shown in FIGS. 2 and 3.

The outer die ring 14 has an inner diameter that is substantially larger than the outer diameter of the inner die plate 12 so that there is an annular space or gap 25 between them. The gap 25 is preferably from about 5–30 mm wide. This permits the inner die plate 12 to move axially (up and down in FIG. 3) within the outer die ring 14, as driven by a press actuator 51 without physically contacting the outer die ring 14. Consequently, scratching or abrading the TEFLON fluorine-containing polymers coated surfaces is avoided. In addition, unlike existing designs, there is no need for extremely close tolerances and concentricities on the diameters of the inner die plate 12 and outer die ring 14, because the die 10 does not rely on a tight sliding fit between them to contain the dough and avoid dough extrusion. This also reduces or eliminates the affects of differential thermal expansion. The inner die plate 12 and outer die ring 14 have a height or thickness of about 20–40 mm, to provide sufficient strength to resist the stresses generated during pressing.

The inner die plate 12 and the outer die ring 14 are connected to one another via a flexible seal 20 which extends across the gap 25. The seal 20 is made of a flexible type of material that does not stick to the pizza dough, for example, rubber. The seal 20 permits axial movement of the inner die plate 12 relative to the outer die ring 14 during the pressing operation. The inner die plate 12 can move within the temporarily fixed outer die ring 14. Preferably, the seal is a silicone and TEFLON fluorine-containing polymers vulcanized composite material. The seal 20 may include a crescent shape 27, as shown in FIG. 4C, that forms a ridge of dough around the periphery of the pizza to form a crust.

The seal 20 acts as a thermal insulating barrier between the inner die plate 12 and the outer die ring 14. This is particularly important for so called "rising crust" pizza. For example, in the rising crust pizza, it is preferable to keep the yeast within the crust portion of the dough alive after pressing, so the crust can rise during the baking process. To this end, it is preferable to have the inner die plate 12 hotter than the outer die ring 14. With the seal 20, the inner die plate 12 can remain significantly hotter than the outer die ring 14 during pressing. Thus, more of the yeast present in the outer portion of the dough remains alive after pressing.

The seal 20 also eliminates the need for closely matching the fit between the inner die plate 12 and the outer die ring 14. This reduces the cost of manufacturing the die 10 and prolongs its useful life. In addition, since the inner die plate 12 and the outer die ring 14 are physically separated by the seal 20, the TEFLON fluorine-containing polymers coating is not scraped off during use, as is common with existing designs. Similarly, the seal 20 eliminates the problems associated with the differential thermal expansion of the inner die plate 12 and the outer die ring 14 during pressing.

Figure 4A:
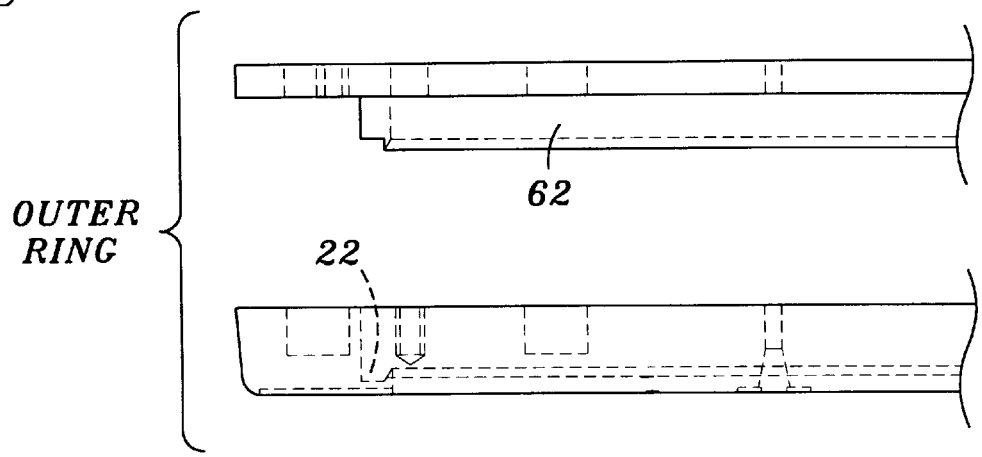
FIG. 4A is an exploded partial side view of the outer die ring shown in FIG. 1(a)
Figure 4B:
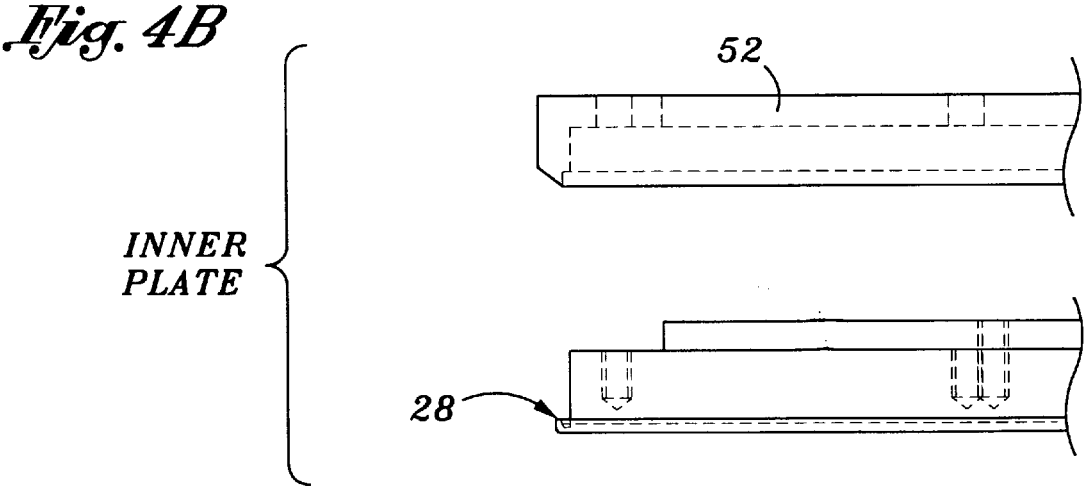
FIG. 4B is an exploded partial side view of the die of the inner die plate shown in FIG. 1(a).
Figure 4C:
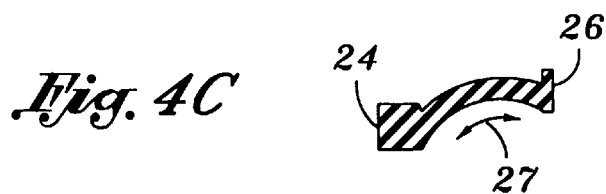
FIG. 4C is a section view of a seal.
Figure 5:
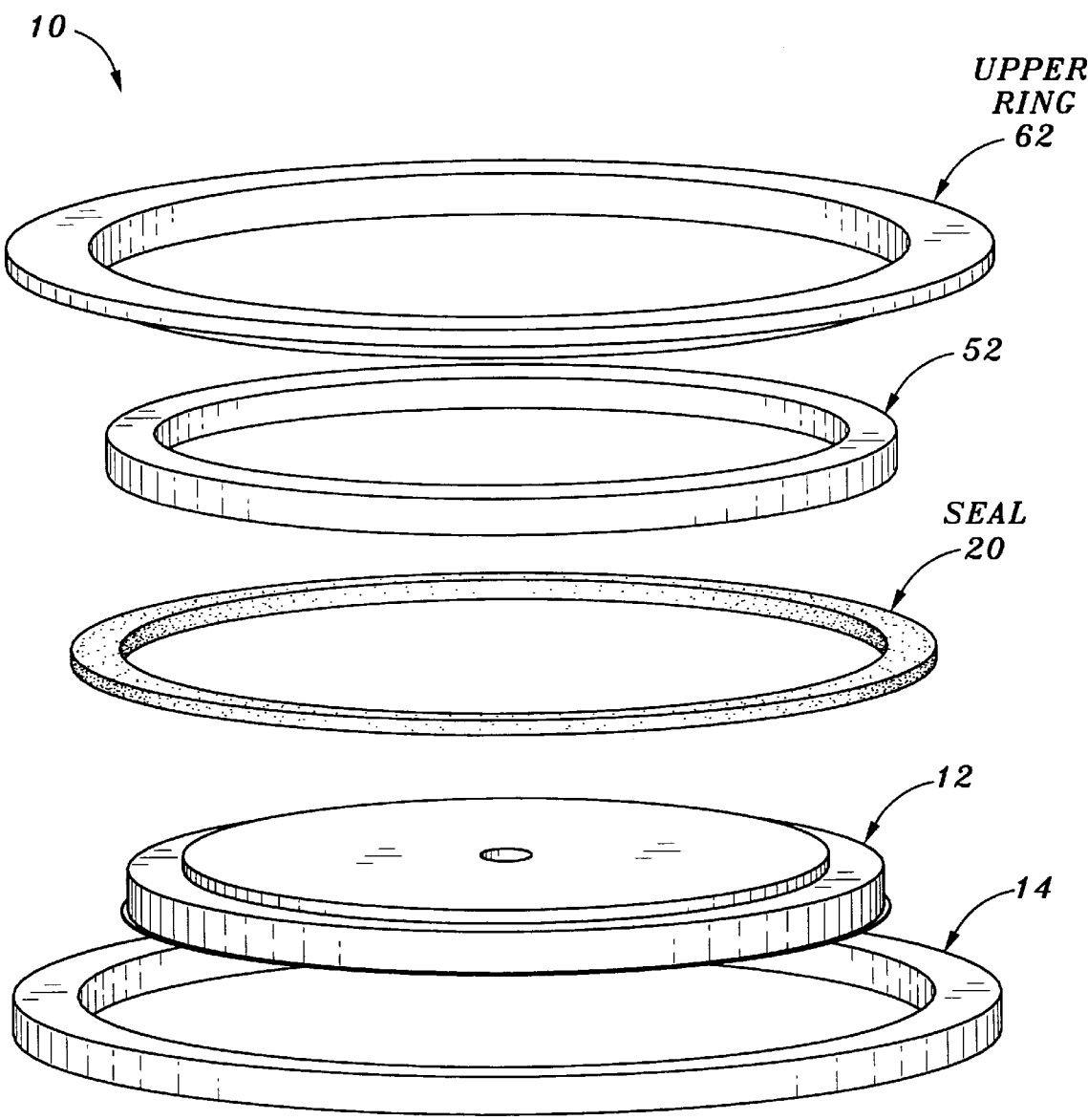
FIG. 5 is an exploded perspective view of the food machine die shown in FIG. 1.

Referring now to FIGS. 1(a) and 4A and 4B, the seal 20 is attached to a channel 22 within the outer die ring 14. The seal 20 includes a boss 24 that fits within the channel 22. On the other (inner) side of the seal 20 is a tongue 26. The tongue 26 engages with a groove 28 located on the inner die plate 12. A plate ring 52 is bolted onto the inner die plate 12, to secure the tongue 26 into the groove 28. Similarly, a top ring 62 is bolted onto the outer die ring 14, to securely hold the boss 24 of the seal 20 into the channel 22, on the outer die ring 14.

Referring now to FIGS. 1(a), 1(b), and 2, the inner die plate 12 includes a through opening 13. An air valve 30 is positioned within the opening 13. The air valve 30 is spring biased into a closed position and rests flush with the flat lower surface of the inner die plate 12. During operation, the air valve 30 opens after pressing to help release the pressed dough from the die. A compressed air pipe in the press introduces air through the opening 13 to create an air bubble between the inner die plate 12 and the dough. The air bubble helps to separate the flattened dough from the die 10, and keep the dough on the conveyer.

Referring now to FIGS. 1(a), 1(b), and 3, during operation, the pizza die 10 is lowered over a dough ball 45 on the conveyor. The outer die ring 14 is pressed tightly against the surface of the conveyor. This movement (usually about a 4–6 inch drop) flattens the dough ball to an initial thickness via the inner die plate 12 pushing down on the dough ball.

During this initial flattening step the die 10 is in the extended state as shown in FIG. 1(a). In this state, the inner die plate 12 is recessed from the outer die ring 14 to form a cavity for receiving and initially flattening the dough ball. After the outer die ring 14 contacts the conveyor surface the die 10 compresses into the compressed state shown in FIG. 1(b). The inner die plate 12 is pushed down, usually about another ½ inch, under a large pressing force, pressing the dough radially outwardly, and causing the dough to flatten and spread to the outer die ring 14.

Upon further compression, the dough reaches the seal 20, wherein the dough forms a ridge within the crescent space to form the pizza lip or outer ridge. The central area of the pizza is flattened to a final thickness. Preferably, the inner die plate 12 and the outer die ring 14 are heated to partially cook the pizza dough. For so called "rising crust" pizza, the outer die ring 14 is advantageously at a lower temperature than the inner die plate 12, thereby permitting the yeast in the periphery of the dough to survive the hot-press process.

After sufficient duration of heating the pizza dough, the inner die plate 12 is retracted into the extended state shown in FIG. 1(a) to release the dough from the die 10. During this release, the air valve 30 opens to release compressed air between the dough and the inner die plate 12. The air forms a bubble that aids in releasing the dough from the die 10. After release, the entire die 10 is lifted up. The conveyor is advanced to bring the next dough ball 45 into position for pressing. At the same time, the released shell 47 moves on the conveyor 40 to a next station for freezing, baking or packaging. Of course, in most applications, rows or arrays of dies 10 will be used in a single press, so that several food products can be made with each press cycle.

The current trend in the pizza industry is to make all pizza shells in a central plant freeze them before baking, and ship them to retail/restaurant outlets. The outlets often want live yeast in the shell, so that it will rise when baked. Cold pressing is the most common way for making shells having live yeast. However, cold pressing requires each dough ball to be placed into a pan. The pan is indexed under a press. The press partially spreads the pizza. The shell then travels on a conveyor for 5 to 45 minutes to a second press station which completes the pressing. While cold pressing works, it has several significant disadvantages. The pans must be replaced periodically, as they deform from the pressing. Cleaning the pans is also time consuming and burdensome. The present invention allows a hot press method to produce a cold press quality (live yeast) product, without the drawbacks of cold pressing.

Thus, an improved pizza die is disclosed. While embodiments and applications of this invention have been shown and described, it would be apparent to those skilled in the art that many more modifications are possible without departing from the scope of the invention. Persons skilled in the art of food machinery will also recognize that the invention can be used in other ways than described, for example, to make other food products. The invention, therefore, is not to be restricted except in the spirit of the appended claims.

What is claimed is:

1. A pizza die comprizing:
   an outer die ring;
   an inner die plate within the outer die ring;
   a flexible seal having a first end and a second end;
   a tongue on the first end of the seal, with the tongue immovably fixed to the inner die plate; and
   a boss on the second end of the seal, with the boss immovably fixed to the outer die ring.

2. The pizza die of claim 1, wherein the flexible seal comprises a silicone and synthetic fluorine-containing resin vulcanized composite.

3. The pizza die of claim 1, wherein said inner die plate comprises a centrally located opening for the passage of a compressed gas.

4. A die for forming pizza dough comprising:
   a substantially circular inner die;
   an outer die ring circumferentially surrounding said inner die, said inner die being axially movable relative to said outer die ring; and
   a circumferential seal attached to both said inner die and to said outer die ring, said circumferential seal having an outer end joined to the outer die ring via an outer attachment joint which prevents relative movement between the outer end and the outer die ring and the circumferential seal having an inner end joined to the inner die via an inner attachment joint which prevents relative movement between the inner end and the inner die.

5. The die according to claim 4, said inner die being axially movable between an extended state and a compressed state.

6. The die according to claim 4, the circumferential seal being made of a silicone and synthetic fluorine-containing resin vulcanized composite.

7. The die according to claim 4, said inner die further including a centrally located opening for the passage of a compressed gas.

8. The die according to claim 4, the inner die further including a layer of synthetic fluorine-containing resin coating thereon.

9. A food press comprising:
   a conveyor belt;
   a press actuator over the conveyor belt;
   a food die attached to the press actuator, the food die including:
      an inner die plate;
      an outer die ring; and
      a flexible seal having an outer end fixed to the outer die ring with an outer attachment preventing relative movement betwen the outer end and the outer die ring, and the flexible seal having an inner end fixed to the inner die plate with an inner attachment preventing relative movement between the inner end and the inner die plate.

10. A food press comprising:
    a conveyor belt;
    a press actuator over said conveyor belt;
    a food die attached to the press actuator, the food die including an inner die plate and an outer die ring attached to the inner die plate by a flexible seal;
    a plate ring bolted onto the inner die plate;
    a top ring bolted onto the outer die ring;
    the plate ring clamping a tongue on an inner perimeter of the seal into a groove in the inner die plate and the top ring clamping a boss on an outer perimeter of the seal into a channel in the outer die ring.

11. The pizza die of claim 1 wherein the seal is crescent shaped.

12. A machine for making pizza dough shells and similar food products comprising:
    an outer die ring having a channel thereon;
    an inner die plate within the outer die ring, the inner die plate having a groove thereon;
    a press actuator attached to the inner die plate for axially moving the inner die plate relative to the outer die ring;
    a flexible seal having a first end fixed onto and movable with the inner die plate and a second end fixed onto the outer die ring;
    a tongue on the first end of the seal, the tongue positioned in the groove;
    a boss on the second end of the seal, the boss positioned in the channel.

13. The machine of claim 12 wherein the outer die ring is spaced apart from the inner die plate by an annular gap having a width of from 5–30 mm.

14. The machine of claim 12 wherein the seal comprises rubber.

* * * * *

UNITED STATES PATENT AND TRADEMARK OFFICE
CERTIFICATE OF CORRECTION

PATENT NO.    : 6,010,325
DATED         : January 4, 2000
INVENTOR(S)   : Eric C. Lawrence It is certified that error appears in the above-identified patent and that said Letters Patent is hereby corrected as shown below:

Column 5,
Line 4, please change "comprizing" to -- comprising --.

Signed and Sealed this

Twenty-fifth Day of September, 2001

*Attest:*

*Nicholas P. Godici*

*Attesting Officer*

NICHOLAS P. GODICI
*Acting Director of the United States Patent and Trademark Office*